US012205535B2

(12) United States Patent
Jing et al.

(10) Patent No.: US 12,205,535 B2
(45) Date of Patent: Jan. 21, 2025

(54) COMPENSATION APPARATUS AND METHOD, DISPLAY APPARATUS AND WORKING METHOD THEREOF, STORAGE MEDIUM

(71) Applicants: Chengdu BOE Optoelectronics Technology Co., Ltd., Sichuan (CN); BOE Technology Group Co., Ltd., Beijing (CN)

(72) Inventors: Tan Jing, Beijing (CN); Xuesong Tian, Beijing (CN); Shanchuan Jin, Beijing (CN); Shiming Li, Beijing (CN); Eunho Lee, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/028,568

(22) PCT Filed: Jun. 30, 2022

(86) PCT No.: PCT/CN2022/102961

§ 371 (c)(1),
(2) Date: Mar. 27, 2023

(87) PCT Pub. No.: WO2024/000460

PCT Pub. Date: Jan. 4, 2024

(65) Prior Publication Data

US 2024/0363061 A1 Oct. 31, 2024

(51) Int. Cl.
*G09G 3/3208* (2016.01)

(52) U.S. Cl.
CPC .................... *G09G 3/3208* (2013.01); *G09G 2320/0242* (2013.01)

(58) Field of Classification Search
CPC ............ G09G 3/36; G09G 2320/0233; G09G 2310/0221; G09G 2320/0285;
(Continued)

(56) References Cited

U.S. PATENT DOCUMENTS 8,077,123 B2 12/2011 Naugler, Jr.
2002/0154379 A1 10/2002 Tonar et al.
2013/0135272 A1 5/2013 Park
(Continued)

FOREIGN PATENT DOCUMENTS

CN 105895056 A 8/2016
CN 107274834 A 10/2017
(Continued)

*Primary Examiner* — Md Saiful A Siddiqui
(74) *Attorney, Agent, or Firm* — Ling Wu; Stephen Yang; Ling and Yang Intellectual Property

(57) ABSTRACT

A compensation apparatus and method, a display apparatus and a working method thereof, and a storage medium are provided, the compensation apparatus includes a first memory, a first timer and a processor; the first timer starts timing from the processor receiving the pixel data to obtain the first timing information and send the first timing information to the processor; the processor receives the pixel data and the first timing information, compensate the gray-scale data of the pixel data according to the first timing information and the compensation parameters in the pre-term compensation parameter set when the first timing information does not reach the first time node value, compensate the gray-scale data of the pixel data according to the first timing information and the compensation parameters in the mid-term compensation parameter set.

20 Claims, 5 Drawing Sheets

(58) Field of Classification Search
CPC .... G09G 2370/08; G09G 3/20; G09G 3/3208; G09G 2320/0242
See application file for complete search history.

(56) References Cited

U.S. PATENT DOCUMENTS

| | | | | |
|---|---|---|---|---|
| 2018/0182285 | A1 | 6/2018 | Wang | |
| 2018/0350296 | A1* | 12/2018 | Thompson | G06F 3/0673 |
| 2019/0051236 | A1 | 2/2019 | Deng et al. | |
| 2020/0226976 | A1 | 7/2020 | Ouyang et al. | |
| 2021/0264858 | A1* | 8/2021 | Wang | G09G 3/3233 |
| 2022/0230589 | A1 | 7/2022 | Xu et al. | |
| 2022/0343845 | A1 | 10/2022 | Wu et al. | |
| 2023/0134326 | A1* | 5/2023 | Lee | G09G 3/3233 345/690 |
| 2023/0237967 | A1* | 7/2023 | Byun | G09G 3/20 345/76 |

FOREIGN PATENT DOCUMENTS

| | | | |
|---|---|---|---|
| CN | 107808632 | A | 3/2018 |
| CN | 105487319 | B | 8/2019 |
| CN | 110808006 | A | 2/2020 |
| CN | 111028778 | A | 4/2020 |
| CN | 111063320 | A | 4/2020 |
| CN | 111179832 | A | 5/2020 |
| CN | 111554236 | A | 8/2020 |
| CN | 112863439 | A | 5/2021 |
| CN | 113178160 | A | 7/2021 |
| CN | 114283728 | A | 4/2022 |
| JP | 2005-55909 | A | 3/2005 |
| TW | 201322241 | A1 | 6/2013 |

* cited by examiner

COMPENSATION APPARATUS AND METHOD, DISPLAY APPARATUS AND WORKING METHOD THEREOF, STORAGE MEDIUM

CROSS-REFERENCE TO RELATED APPLICATION

The present application is a U.S. National Phase Entry of International Application No. PCT/CN2022/102961 having an international filing date of Jun. 30, 2022. The above-identified application is hereby incorporated by reference.

TECHNICAL FIELD

Embodiments of the present disclosure relate to, but are not limited to, the field of display technologies, and particularly to a compensation apparatus and a method, a display apparatus and a working method thereof, and a storage medium.

BACKGROUND

The Organic Light Emitting Diode (OLED) display panel has been widely used for its characteristics, such as self-luminescence, low drive voltage and fast response. The OLED display panel has been widely used in a large-sized product with a display function, such as a computer, a television (TV), a medical monitoring apparatus, a laptop computer and a vehicle-mounted central control apparatus.

SUMMARY

The following is a summary of subject matters described herein in detail. The summary is not intended to limit the protection scope of claims.

In a first aspect, embodiments of the present disclosure provide a compensation apparatus comprising a first memory, a first timer and a processor;

- the first memory is configured to store a first time node value, a second time node value, a pre-term compensation parameter set, a mid-term compensation parameter set and a post-term compensation parameter set; the first time node value is less than the second time node value, the pre-term compensation parameter set, the mid-term compensation parameter set and the post-term compensation parameter set all comprise at least one compensation parameter and the value of the same compensation parameter in the pre-term compensation parameter set and the post-term compensation parameter set is different from the value in the mid-term compensation parameter set, values of the compensation parameter in the pre-term compensation parameter set are gradually decreased with time, while values of the compensation parameter in the post-term compensation parameter set are gradually increased with time; the first timer is connected with the processor and is configured to start timing when the processor receives pixel data, obtain first timing information, and send the first timing information to the processor, wherein the pixel data comprises gray-scale data;

The processor is connected with the first timer and the first memory respectively and is configured to receive pixel data and the first timing information, and to compensate the gray-scale data of the pixel data according to the first timing information and the compensation parameters in the pre-term compensation parameter set when the first timing information does not reach the first time node value; the gray-scale data of the pixel data is compensated according to the first timing information and the compensation parameters in the mid-term compensation parameter set when the first timing information reaches the first time node value and does not reach the second time node value; and the gray-scale data of the pixel data is compensated according to the first timing information and the compensation parameters in the post-term compensation parameter set when the first timing information reaches the second time node value.

In an exemplary implementation, a value of the same compensation parameter in the pre-term compensation parameter set and the post-term compensation parameter set is different from a value of the same compensation parameter in the mid-term compensation parameter set, which includes a case that a value of the same compensation parameter in the pre-term compensation parameter set and the post-term compensation parameter set is greater than a value of the same compensation parameter in the mid-term compensation parameter set.

In an exemplary implementation, the first memory is further configured to store a third time node value and a maximum compensation parameter set, wherein the third time node value is greater than the second time node value, and the maximum compensation parameter set at least includes one compensation parameter and a value of the same compensation parameter in the maximum compensation parameter set is greater than a value of the same compensation parameter in the post-term compensation parameter set; and the processor is further configured to compensate the gray-scale data of the pixel data according to the first timing information and the compensation parameter in the maximum compensation parameter set when the first timing information reaches the third time node value.

In an exemplary implementation, the first memory is configured to store compensation parameters corresponding to a plurality of time points, and the pre-term compensation parameter set includes compensation parameters corresponding to a plurality of time points before the first time node value; the mid-term compensation parameter set includes compensation parameters corresponding to a plurality of time points between the first time node value and the second time node value; the post-term compensation parameter set includes compensation parameters corresponding to a plurality of time points between the second time node value and the third time node value; the maximum compensation parameter set includes compensation parameters corresponding to a plurality of time points after the third time node value; and the processor is configured to search a corresponding time point according to the first timing information, determine a compensation parameter set according to the searched time point, and compensate the gray-scale data of the received pixel data according to the compensation parameter in the determined compensation parameter set corresponding to the searched time point to obtain compensated gray-scale data.

In an exemplary implementation, in the pre-term compensation parameter set, a plurality of compensation parameter values of the same compensation parameter are gradually decreased according to a sequence of the corresponding time points; In the mid-term compensation parameter set, the parameter values of the same compensation parameter are the same; In the post-term compensation parameter set, a plurality of parameter values of the same compensation parameter are gradually increased according to a sequence of corresponding time points; In the maximum compensation parameter set, the parameter values of the same compensation parameter are the same.

In an exemplary implementation, the compensation parameters corresponding to the plurality of time points include luminance weights and gray-scale weights corresponding to the plurality of time points; The processor is configure to determine a corresponding time point according to the first timing information, determine a corresponding luminance weight and a corresponding gray-scale weight according to the determined time point, multiply the acquired luminance weight by the determined gray-scale weight to obtain a compensated gray-scale weight, and obtain compensated gray-scale data according to the gray-scale data in the pixel data and the compensated gray-scale weight.

In an exemplary implementation, the processor is configured to multiply the gray-scale data in the pixel data by a compensated gray-scale weight to obtain compensated gray-scale data.

In an exemplary implementation, the compensation apparatus further includes a timing memory; the timing memory is connected with the processor and the first timer, and is configured to store a first timing information of the first timer; and the first timer is further connected to the timing memory, and is configured to read the first timing information in the timing memory in a case that the processor is restarted after being powered off, and to continue timing based on the first timing information stored in the first memory in a case that the processor is restarted and restarts to receive pixel data.

In an exemplary implementation, the compensation apparatus further includes a second timer, a second memory and a temperature sensor; the second memory is connected with the processor, and is configured to store a temperature threshold, test compensation parameters corresponding to a plurality of time points, a high gray-scale threshold and a low gray-scale threshold; the temperature sensor is connected with the processor, and is configured to acquire temperature information and transmit the temperature information to the processor; the second timer is connected with the processor, and is configured to perform timing under the control of the processor to obtain second timing information and send the second timing information to the processor; and the processor is respectively connected with the second timer, the second memory and the temperature sensor, and is further configured to acquire test pixel data and temperature information, obtain gray-scale distribution information of the test pixel data according to the gray-scale data in the test pixel data, control the second timer to start timing when the high gray scale ratio of the gray-scale distribution information exceeds the high gray-scale threshold, or the low gray-scale ratio of the gray-scale distribution information exceeds the low gray-scale threshold, or the acquired temperature information exceeds the temperature threshold, and compensate the gray-scale data in the test pixel data according to the second timing information and the test compensation parameters corresponding to the plurality of time points.

In an exemplary implementation, the test compensation parameter includes a test luminance weight and a test gray-scale weight; The processor is configured to determine a corresponding time point according to the second timing information, determine a corresponding test luminance weight and a corresponding test gray-scale weight according to the determined time point, multiply the test luminance weight by the test gray-scale weight to obtain a test compensation gray-scale weight, and multiply the gray-scale data in the test pixel data by the test compensation gray-scale weight to obtain the compensated test gray-scale data.

In an exemplary embodiment, the second memory is configured to store a first test time node value, a second test time node value, a third test time node value, pre-term test compensation data, mid-term test compensation data, post-term test compensation data and maximum test compensation data; the first test time node value is less than the second test time node value, and the second test time node value is less than the third test time node value; the pre-term test compensation data comprises test luminance weights and test gray-scale weights corresponding to a plurality of time points before the first test time node, the mid-term test compensation data includes test luminance weights and test gray-scale weights corresponding to a plurality of time points between the first test time node and the second test time node, the post-term test compensation data comprises test luminance weights and test gray-scale weights corresponding to a plurality of time points between the second test time node and the third test time node, and the maximum test compensation data comprises test luminance weights and test gray-scale weights corresponding to a plurality of time points after the third test time node; in the pre-term test compensation data, the values of the plurality of test luminance weights and the plurality of test gray-scale weights are gradually decreased according to the sequence of corresponding time points;

in the mid-term test compensation data and the maximum test compensation data, the values of the plurality of test luminance weights and the plurality of test gray-scale weights remain unchanged; In the post-term test compensation data, the values of the plurality of test luminance weights and the plurality of test gray-scale weights are gradually increased according to the sequence of corresponding time points;

The values of the test luminance weights and the test gray-scale weights corresponding to the plurality of time points in the mid-term test compensation data are smaller than the values of the test luminance weights and the test gray-scale weights corresponding to the plurality of time points in the pre-term test compensation data and the post-term test compensation data; the values of the test luminance weights and the test gray-scale weights corresponding to the plurality of time points in the maximum test compensation data are larger than the values of the test luminance weights and the test gray-scale weights corresponding to the plurality of time points in the pre-term test compensation data and the post-term test compensation data.

In a second aspect, an embodiment of the present disclosure further provides a compensation method, including:

acquiring a first time node value, a second time node value, a pre-term compensation parameter set, a post-term compensation parameter set and a maximum compensation parameter set; the first time node value is less than the second time node value, the pre-term compensation parameter set, the mid-term compensation parameter set and the post-term compensation parameter set all include at least one compensation parameter and the value of the same compensation parameter in the pre-term compensation parameter set and the post-term compensation parameter set is different from the value in the mid-term compensation parameter set, the compensation parameter value in the pre-term compensation parameter set are gradually decreased with time, and the compensation parameter value in the post-term compensation parameter set are gradually increased with time;

starting to receive pixel data, controlling the first timer to start timing, and obtaining first timing information obtained by the first timer; the pixel data includes gray-scale data;

compensating the gray-scale data of the pixel data according to the first timing information and the compensation parameters in the pre-term compensation parameter set when the first timing information does not reach the first time node value; compensating the gray-scale data of the pixel data according to the first timing information and the compensation parameters in the mid-term compensation parameter set when the first timing information reaches the first time node value and does not reach the second time node value; and compensating the gray-scale data of the pixel data according to the first timing information and the compensation parameters in the post-term compensation parameter set when the first timing information reaches the second time node value.

In an exemplary implementation, a value of the same compensation parameter in the pre-term compensation parameter set and the post-term compensation parameter set is different from a value of the same compensation parameter in the mid-term compensation parameter set, which includes a case that a value of the same compensation parameter in the pre-term compensation parameter set and the post-term compensation parameter set is greater than a value of the same compensation parameter in the mid-term compensation parameter set.

In an exemplary implementation, before starting to receive the pixel data, the compensation method further comprises: acquiring a third time node value and a maximum compensation parameter set, wherein the third time node value is greater than the second time node value, and the maximum compensation parameter set at least includes one compensation parameter and a value of the same compensation parameter in the maximum compensation parameter set is greater than a value of the same compensation parameter in the post-term compensation parameter set; and after starting to receive the pixel data, the compensation method further comprises: compensating the gray-scale data of the pixel data according to the first timing information and the compensation parameter in the maximum compensation parameter set when the first timing information reaches the third time node value.

In an exemplary implementation, before starting to receive the pixel data, the compensation method further comprises: acquiring compensation parameters corresponding to a plurality of time points, wherein the pre-term compensation parameter set includes compensation parameters corresponding to a plurality of time points before the first time node value; the mid-term compensation parameter set includes compensation parameters corresponding to a plurality of time points between the first time node value and the second time node value; the post-term compensation parameter set includes compensation parameters corresponding to a plurality of time points between the second time node value and the third time node value; the maximum compensation parameter set includes compensation parameters corresponding to a plurality of time points after the third time node value; and searching a corresponding time point according to the first timing information, determining a compensation parameter set according to the searched time point, and compensating the gray-scale data of the received pixel data according to the compensation parameter corresponding to the searched time point in the determined compensation parameter set to obtain compensated gray-scale data.

In an exemplary implementation, in the pre-term compensation parameter set, a plurality of compensation parameter values of the same compensation parameter are gradually decreased according to a sequence of the corresponding time points; in the mid-term compensation parameter set, the parameter values of the same compensation parameter are the same; in the post-term compensation parameter set, the plurality of parameter values of the same compensation parameter are gradually increased according to a sequence of corresponding time points; in the maximum compensation parameter set, the parameter values of the same compensation parameter are the same.

In an exemplary implementation, the compensation parameters corresponding to the plurality of time points include luminance weights and gray-scale weights corresponding to the plurality of time points; and searching a corresponding time point according to the first timing information, determining a compensation parameter set according to the searched time point, and compensating the gray-scale data of the received pixel data according to the compensation parameter corresponding to the searched time point in the determined compensation parameter set to obtain compensated gray-scale data comprises: determining a corresponding time point according to the first timing information, determining a corresponding luminance weight and a corresponding gray-scale weight according to the determined time point, multiplying the acquired luminance weight by the determined gray-scale weight to obtain a compensated gray-scale weight, and obtaining compensated gray-scale data according to the gray-scale data in the pixel data and the compensated gray-scale weight.

In an exemplary implementation, obtaining compensated gray-scale data according to the gray-scale data in the pixel data and the compensated gray-scale weight includes: multiplying the gray-scale data in the pixel data by the compensated gray-scale weight to obtain the compensated gray-scale data.

In an exemplary implementation, after starting to receive the pixel data, the compensation method further includes: storing the first timing information of the first timer; and in the case of restarting a compensation apparatus to which the compensation method applied after the compensation apparatus being powered off, reading the stored first timing information, and in the case of restarting the compensation apparatus and the compensation apparatus restarting to receive the pixel data, continuing timing on the basis of the stored first timing information.

In an exemplary implementation, before starting to receive the pixel data, the compensation method further comprises: obtaining a temperature threshold, a test compensation parameter corresponding to a plurality of time points, a high gray-scale threshold and a low gray-scale threshold; controlling the temperature sensor to obtain temperature information; and acquiring test pixel data, obtaining gray-scale distribution information of the test pixel data according to the gray-scale data in the test pixel data, controlling the second timer to start timing when the high gray scale ratio of the gray-scale distribution information exceeds the high gray-scale threshold, or the low gray-scale ratio of the gray-scale distribution information exceeds the low gray-scale threshold, or the acquired temperature information exceeds the temperature threshold, and compensating the gray-scale data in the test pixel data according to the second timing information and the test compensation parameters corresponding to the plurality of time points.

In an exemplary implementation, the test compensation parameter includes a test luminance weight and a test gray-scale weight; compensating the gray-scale data in the test pixel data according to the second timing information and the test compensation parameters corresponding to a plurality of time points includes: determining a corresponding time point according to the second timing information, determining a corresponding test luminance weight and a corresponding test gray-scale weight according to the determined time point, multiplying the test luminance weight by the test gray-scale weight to obtain a test compensation gray-scale weight, and multiplying the gray-scale data in the test pixel data by the test compensation gray-scale weight to obtain the compensated test gray-scale data.

In the exemplary implementation, before acquiring the test pixel data, the compensation method further includes: acquiring a first test time node value, a second test time node value, a third test time node value, a pre-term test compensation data, a mid-term test compensation data and a post-term test compensation data and the maximum test compensation data; a value of the first test time node is less than a value of the second test time node, and the value of the second test time node is less than a value of the third test time node;

the pre-test compensation data comprises test luminance weights and test gray-scale weights corresponding to a plurality of time points before the first test time node, the mid-term test compensation data includes test luminance weights and test gray-scale weights corresponding to a plurality of time points between the first test time node and the second test time node, the post-test compensation data comprises test luminance weights and test gray-scale weights corresponding to a plurality of time points between the second test time node and the third test time node, and the maximum test compensation data comprises test luminance weights and test gray-scale weights corresponding to a plurality of time points after the third test time node; in the pre-test compensation data, the values of the plurality of test luminance weights and the plurality of test gray-scale weights are gradually decreased according to the sequence of corresponding time points;

in the mid-test compensation data and the maximum test compensation data, the values of the plurality of test luminance weights and the plurality of test gray-scale weights remain unchanged; in the post-term test compensation data, the values of the plurality of test luminance weights and the plurality of test gray-scale weights are gradually increased according to the sequence of corresponding time points; the values of the test luminance weights and the test gray-scale weights corresponding to the plurality of time points in the mid-term test compensation data are smaller than the values of the test luminance weights and the test gray-scale weights corresponding to the plurality of time points in the pre-term test compensation data and the post-term test compensation data; and the values of the test luminance weights and the test gray-scale weights corresponding to the plurality of time points in the maximum test compensation data are larger than the values of the test luminance weights and the test gray-scale weights corresponding to the plurality of time points in the pre-term test compensation data and the post-term test compensation data.

In a third aspect, the embodiment of the present disclosure further provides a display apparatus, comprising a display substrate and a compensation apparatus described in any of the above embodiments, wherein the compensation apparatus is electrically connected with the display substrate.

In a fourth aspect, the embodiment of the present disclosure further provides a working method of the display apparatus, including: compensating the gray-scale data in the pixels of the display panel according to the compensation method described in any of the above embodiments, obtaining the compensated gray-scale data and displaying according to the compensated gray-scale data.

In a fifth aspect, an embodiment of the present disclosure further provides a non-transitory computer-readable storage medium configured to store computer program instructions, wherein when the computer program instructions are executed, the compensation method according to any one of the aforementioned embodiments may be implemented.

Other aspects may be understood upon reading and understanding the drawings and the detailed description.

BRIEF DESCRIPTION OF DRAWINGS

The drawings are intended to provide a further understanding for technical solutions of the present disclosure and form a part of the specification, and are used to explain the technical solutions of the present disclosure together with embodiments of the present disclosure, and not intended to form limitations on the technical solutions of the present disclosure. Shapes and sizes of each component in the drawings do not reflect actual scales, and are only intended to schematically illustrate contents of the present disclosure.

DETAILED DESCRIPTION

Figure 1:
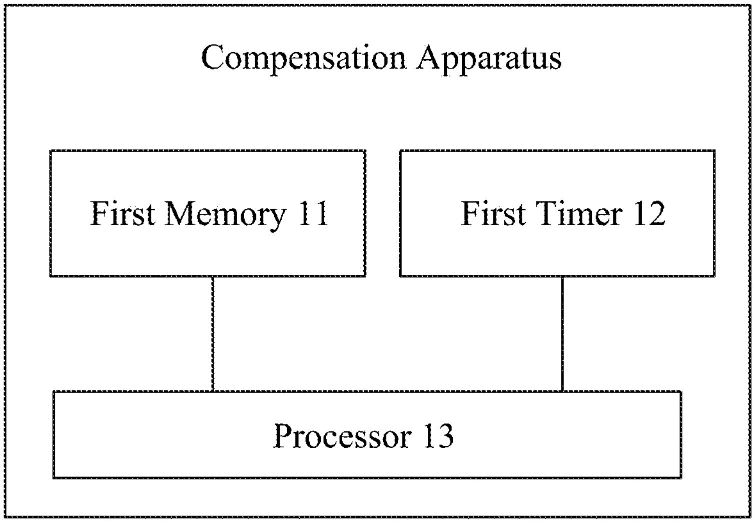
FIG. 1 is a schematic diagram of a structure of a compensation apparatus provided by an embodiment of the present disclosure.

The embodiments of the present disclosure will be described in detail below with reference to the drawings. Implementations may be implemented in a plurality of different forms. Those of ordinary skills in the art may easily understand such a fact that implementations and contents may be transformed into various forms without departing from the purpose and scope of the present disclosure. Therefore, the present disclosure should not be explained as being limited to contents described in following implementation modes only. The embodiments in the present disclosure and features in the embodiments may be combined randomly with each other if there is no conflict. In order to keep following description of the embodiments of the present disclosure clear and concise, detailed descriptions about part of known functions and known components are omitted in the present disclosure. The drawings of the embodiments of the present disclosure only involve structures involved in the embodiments of the present disclosure, and other structures may refer to usual designs.

Ordinal numerals such as "first", "second", and "third" in the specification are set to avoid confusion of constituent elements, but not to set a limit in quantity.

In the specification, unless otherwise specified and defined explicitly, terms "mount", "mutually connect", and "connect" should be understood in a broad sense. For example, the connection may be a fixed connection, a detachable connection or an integrated connection. It may be a mechanical connection or an electrical connection. It may be a direct mutual connection, or an indirect connection through middleware, or internal communication between two components. Those of ordinary skill in the art may understand specific meanings of these terms in the present disclosure according to specific situations.

In the specification, "electrical connection" includes a case that constituent elements are connected together through an element with a certain electrical effect. The "element with the certain electrical effect" is not particularly limited as long as electrical signals may be sent and received between the connected constituent elements. Examples of the "element having some electrical function" not only include an electrode and a wiring, but also a switch element such as a transistor, a resistor, an inductor, a capacitor, other elements having one or more functions, and the like.

The service life of electronic products equipped with small or medium-sized display panels is about 2~3 years. According to the requirements of electronic products for the service life of display panels, the aging compensation of display panels may be achieved by optimizing the structure of devices, using luminescent materials with longer service life and matching DBI (DeBurnIn) algorithm, and the service life of small-sized display panels may usually reach the standard.

Under the relatively strict use environment of the display panel, for example, in summer the car screen is exposed to high temperature for a long time, and the display panel often works in strong ambient light, and the display screen is more simple than the mobile phone, which mostly are some fixed icons or navigation screens; the display panel on the laptop computer is also usually used in strong ambient light, with fixed icons (such as windows icon in the lower left corner of desktop, etc.) during use, and the service lives of car screens and laptop computers obviously need to be longer than that of small and medium-sized electronic products, so that there are extremely strict requirements for the service life of large-size display panels. Even after optimizing the device structure, using luminescent materials with longer life and matching the DBI (DeBurnIn) algorithm, the display panels still have serious aging problems, and the service life of the display panels is still difficult to reach the standard.

Embodiments of the present disclosure provide a compensation apparatus, as shown in FIG. 1, which may include a first memory 11, a first timer 12 and a processor 13;

a first memory 11 is connected to a processor 13, and is configured to store a first time node value, a second time node value, a pre-term compensation parameter set, a mid-term compensation parameter set, and a post-term compensation parameter set; the first time node value is less than the second time node value, the pre-term compensation parameter set, the mid-term compensation parameter set and the post-term compensation parameter set all include at least one compensation parameter and the value of the same compensation parameter in the pre-term compensation parameter set and the mid-term compensation parameter set is different from the value in the post-term compensation parameter set, and the compensation parameter value in the pre-term compensation parameter set gradually decreases with time, while the compensation parameter value in the post-term compensation parameter set gradually increases with time;

the first timer 12 is connected with the processor 13 and may be configured to start timing when the processor 13 receives pixel data to obtain first timing information, and to send the first timing information to the processor 13; the pixel data comprises gray-scale data;

the processor 13 is connected with the first timer 12 and the first memory 11 respectively and may be configured to receive pixel data and the first timing information, and to compensate the gray-scale data of the pixel data according to the first timing information and the compensation parameters in the pre-term compensation parameter set when the first timing information does not reach the first time node value; the gray-scale data of the pixel data is compensated according to the first timing information and the compensation parameters in the mid-term compensation parameter set when the first timing information reaches the first time node value and does not reach the second time node value; and the gray-scale data of the pixel data is compensated according to the first timing information and the compensation parameters in the post-term compensation parameter set when the first timing information reaches the second time node value.

In the compensation apparatus provided by an embodiment of the present disclosure provides, the first timer is configured to start timing from the processor receiving the pixel data to obtain the first timing information and send the first timing information to the processor, wherein the processor is configured to receive the pixel data and the first timing information, compensate the gray-scale data of the pixel data according to the first timing information and the compensation parameters in the pre-term compensation parameter set when the first timing information does not reach the first time node value, and compensate the gray-scale data of the pixel data according to the first timing information and the compensation parameters in the mid-term compensation parameter set when the first timing information reaches the first time node value and does not reach the second time node value; and the gray-scale data of the pixel data is compensated according to the first timing information and the compensation parameters in the post-term compensation parameter set when the first timing information reaches the second time node value. The compensation structure provided by the embodiment of the invention is applied to the display panel, so that the aging of the display panel is slowed down to a great extent, and the service life of the display panel is prolonged.

In an exemplary implementation, a value of the same compensation parameter in the pre-term compensation parameter set and the post-term compensation parameter set is different from a value of the same compensation parameter in the mid-term compensation parameter set, which may include a case that a value of the same compensation parameter in the pre-term compensation parameter set and the post-term compensation parameter set is greater than a value of the same compensation parameter in the mid-term compensation parameter set.

In an embodiment of the present disclosure, the use time of the display panel may be divided into preceding term, middle term and post term according to the first time node and the second time node, and in these three terms, the pixel data is compensated by the pre-term compensation parameter set, the mid-term compensation parameter set and the post-term compensation parameter set respectively, so that the compensation parameter value in the pre-term compensation parameter set gradually decreases, and the compensation parameter value in the post-term compensation parameter set gradually increases, which appropriately decreases the pre-term gray scale of the display panel. By appropriately decreasing gray scale in the pre-term of the display panel, and appropriately increasing gray scale in the post-term of the display panel, the display effect difference of the three nodes of the display panel in the preceding term, the middle term and the post term may become small, and the aging speed of the display panel may be slowed down.

In an exemplary implementation, the first memory 11 may be further configured to store a third time node value and a maximum compensation parameter set, wherein the third time node value is greater than the second time node value, and the maximum compensation parameter set at least includes one compensation parameter and a value of the same compensation parameter in the maximum compensation parameter set is greater than a value of the same compensation parameter in the post-term compensation parameter set; and the processor 13 may be further configured to compensate the gray-scale data of the pixel data according to the first timing information and the compensation parameter in the maximum compensation parameter set when the first timing information reaches the third time node value.

In an embodiment of the present disclosure, after the third time node, the display panel uses the maximum compensation parameter set to compensate, and the value of the compensation parameter in the maximum compensation parameter set is larger than the value in the post-term compensation parameter set, so that the display panel uses the maximum compensation value to compensate the gray scale in the last use stage to improve the display effect of the display panel in the last working stage.

In an exemplary implementation, the first memory may be configured to store compensation parameters corresponding to a plurality of time points, and the pre-term compensation parameter set includes compensation parameters corresponding to a plurality of time points before the first time node; the mid-term compensation parameter set includes compensation parameters corresponding to a plurality of time points between the first time node and the second time node; the post-term compensation parameter set includes compensation parameters corresponding to a plurality of time points between the second time node and the third time node; the maximum compensation parameter set includes compensation parameters corresponding to a plurality of time points after the third time node; and the processor may be configured to search a corresponding time point according to the first timing information, determine a compensation parameter set according to the searched time point, and compensate the gray-scale data of the received pixel data according to the compensation parameter corresponding to the searched time point in the determined compensation parameter set, to obtain compensated gray-scale data.

In an exemplary implementation, in the pre-term compensation parameter set, a plurality of compensation parameter values of the same compensation parameter gradually decrease according to a sequence of the corresponding time points; in the mid-term compensation parameter set, the parameter values of the same compensation parameter are the same; in the post-term compensation parameter set, the plurality of parameter values of the same compensation parameter gradually increase according to a sequence of corresponding time points; in the maximum compensation parameter set, the parameter values of the same compensation parameter are the same.

In an embodiment of the present disclosure, the first time node, the second time node and the third time node may be set according to the service period of the display panel and the aging characteristics of the display panel. For example, the compensation parameter for gray-scale compensation gradually decreases slowly in the preceding term when the gray-scale display of the display panel decreases rapidly; the gray scale may be compensated by a substantially constant compensation parameter in the middle term of the use of display panel when the aging speed slows down; the compensation parameter value of the gray scale may be gradually increased in the post term of the display panel when the display panel is further aged, and when a maximum compensation parameter value is reached, a constant maximum compensation parameter is adopted for compensation. For example, the first time node is the time point that the display panel works for about 500 hours, the second time node is the time point that the display panel works for 1500 hours, and the third time node may be the time point that the display panel works for about 3000 hours.

In an embodiment of the present disclosure, the value of the compensation parameter may be a value less than or equal to 1, and for example, a plurality of compensation parameter values of the same compensation parameter gradually decrease from 1 to 0.5 according to the sequence of corresponding time points in the pre-term compensation parameter set; the parameter values of the same compensation parameter in the mid-term compensation parameter set are the same, which may be, for example, 0.5; the parameter values of the same compensation parameters gradually increase from 0.5 to 1 according to the sequence of corresponding time points in the post-term compensation parameter set; and the parameter values of the same compensation parameters are the same in the maximum compensation parameter set, which may be, for example, 1.

In an exemplary implementation, the compensation parameters corresponding to the plurality of time points may include luminance weights and gray-scale weights corresponding to the plurality of time points; and The processor 13 may be configured to determine a corresponding time point according to the first timing information, determine a corresponding luminance weight and a corresponding gray-scale weight according to the determined time point, multiply the acquired luminance weight by the determined gray-scale weight to obtain a compensated gray-scale weight, and obtain compensated gray-scale data according to the gray-scale data in the pixel data and the compensated gray-scale weight.

In an exemplary implementation, the processor 13 may be configured to multiply the gray-scale data in the pixel data by a compensated gray-scale weight to obtain compensated gray-scale data.

For example, according to the first timing information, it is determined that the corresponding time point is before the first time node, and the processor 13 determines a corresponding luminance weight of 0.8 and a gray-scale weight of 0.6 according to the determined time point, multiplies the acquired luminance weight of 0.8 by the determined gray-scale weight of 0.6 to obtain a compensated gray-scale weight of 0.48, and multiplies the gray-scale data in the pixel data by the compensated gray-scale weight of 0.48 to obtain compensated gray-scale data.

In an embodiment of the present disclosure, the processor 13 may: acquire luminance data of the pixel data (the luminance data may be a digital luminance value, whose full name is Digital Brightness Value in English, DBV for short), correspondingly set a luminance weight for the DBV corresponding to each time point, set a gray-scale weight for each time point, multiply the luminance weight by the gray-scale weight corresponding to the time point when the first timer reaches the corresponding time point to obtain a compensated gray-scale weight, and multiply the compensated gray-scale weight by the gray-scale data in the pixel to obtain a compensated gray-scale data.

In the embodiment of the disclosure, gray-scale compensation is used for the whole display panel, so that the trend of slowing down aging is substantially consistent, and the problem of local overcompensation of the display panel is not easy to occur.

In an exemplary implementation, the compensation apparatus may further include a timing memory; the timing memory is connected to the processor 13 and the first timer 12, and is configured to store first timing information of the first timer 12; the first timer 12 is further connected to the timing memory, and is configured to read the first timing information in the timing memory in a case that the processor 13 is restarted after being powered off, and to continue timing based on the first timing information stored in the first memory 11 in a case that the processor 13 is restarted and restarts to receive a pixel data.

In an embodiment of the present disclosure, when the display panel stops working and is operated again after a while, the timing may be continued based on the first timing information where the display panel stops working through a timing memory storing the first timing information of the first timer 12, which thus avoids accumulating the non-working time period in the first timing information, thereby improving the accuracy of gray-scale compensation of the display panel.

In an exemplary implementation, the compensation apparatus may further include a second timer, a second memory and a temperature sensor; the second memory is connected with the processor 13, and may be configured to store a temperature threshold, test compensation parameters corresponding to a plurality of time points, a high gray-scale threshold and a low gray-scale threshold; the temperature sensor is connected with the processor 13, and may be configured to acquire temperature information and transmit the temperature information to the processor 13; the second timer is connected with the processor 13, and may be configured to perform timing under the control of the processor 13 to obtain second timing information and send the second timing information to the processor 13; and the processor 13 is respectively connected with the second timer, the second memory and the temperature sensor, and may be further configured to acquire test pixel data and temperature information, obtain gray-scale distribution information of the test pixel data according to the gray-scale data in the test pixel data, control the second timer to start timing when the high gray scale ratio of the gray-scale distribution information exceeds the high gray-scale threshold, or the low gray-scale ratio of the gray-scale distribution information exceeds the low gray-scale threshold, or the acquired temperature information exceeds the temperature threshold, and compensate the gray-scale data in the test pixel data according to the second timing information and the test compensation parameters corresponding to the plurality of time points.

Figure 3:
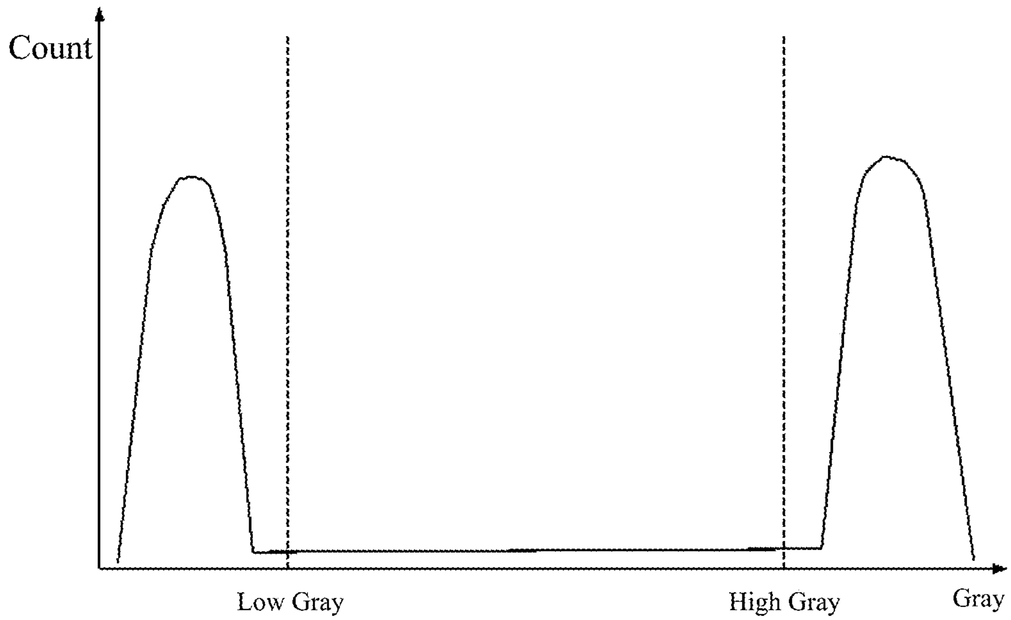
FIG. 3 is a schematic diagram of a respective gray provided by an exemplary embodiment of the present disclosure.

As shown in FIG. 3, in the gray-scale distribution information of the test pixel data acquired by the processor 13, the distribution of low gray-scale (gray-scale value is less than Low Gray) and high gray-scale (gray-scale value is greater than High Gray) are relatively concentrated, and the proportion of low gray-scale exceeding the low gray-scale threshold may be understood as a ratio of low gray-scale data to the total number of gray-scale data being greater than the low gray-scale threshold, that is, the proportion of values less than Low Gray exceeds the low gray-scale threshold; the proportion of high gray-scale exceeding the high gray-scale threshold may be understood as a ratio of high gray-scale data to the total number of gray-scale data being greater than the high gray-scale threshold, that is, the proportion of values greater than High Gray exceeds the high gray-scale threshold. For example, the high gray-scale threshold can be set to be 0.3 and the low gray-scale threshold may be set to be 0.3.

In an embodiment of the present disclosure, temperature information may be acquired by a temperature sensor, and a temperature threshold may be set according to an actual situation.

In an embodiment of the present disclosure, in the test stage of the display panel, a plurality of parameters can be adjusted (such as high gray-scale threshold, low gray-scale threshold and temperature threshold), parameters such as high gray-scale threshold, low gray-scale threshold and temperature threshold may be flexibly configured, and different thresholds may be set for aging testing of different display panels, thus improving the flexibility of the display panel in the aging testing process. For example, if one or more of the high gray-scale threshold, the low gray-scale threshold and the temperature threshold may be set to exceed the standard, the second timer may be controlled to start timing, and the gray-scale data in the test pixel data may be compensated according to the second timing information and test compensation parameters corresponding to a plurality of time points.

In an exemplary implementation, the test compensation parameters may include a luminance weight and a test gray-scale weight; The processor 13 may be configured to determine a corresponding time point according to the second timing information, determine a corresponding test luminance weight and a corresponding test gray-scale weight according to the determined time point, multiply the test luminance weight by the test gray-scale weight to obtain a test compensation gray-scale weight, and multiply the test compensated gray-scale weight by the gray-scale data in the test pixel data to obtain the compensated test gray-scale data.

In an embodiment of the present disclosure, the processor 13 may: acquire test luminance data of the test pixel data (the luminance data may be a digital luminance value, whose full name is Digital Brightness Value in English, DBV for short), correspondingly set a test luminance weight for the DBV corresponding to each time point, set a test gray-scale weight for each time point, multiply the test luminance weight by the test gray-scale weight corresponding to the time point when the second timer reaches the corresponding time point to obtain a test compensated gray-scale weight, and multiply the compensated gray-scale weight by the gray-scale data in the pixel to obtain a compensated gray-scale data.

In an embodiment of the present disclosure, according to the aging test process of the display panel, the aging speed may be effectively reduced, the aging time is 500 h, the service life may be conservatively estimated to be increased by about 20%. In an exemplary implementation, the second memory may be configured to store a first test time node value, a second test time node value, a third test time node value, pre-term test compensation data, mid-term test compensation data, post-term test compensation data and maximum test compensation data; the value of the first test time node is less than the value of the second test time node, and the value of the second test time node is less than the value of the third test time node;

the pre-test compensation data comprises test luminance weights and test gray-scale weights corresponding to a plurality of time points before the first test time node, the mid-term test compensation data includes test luminance weights and test gray-scale weights corresponding to a plurality of time points between the first test time node and the second test time node, the post-test compensation data comprises test luminance weights and test gray-scale weights corresponding to a plurality of time points between the second test time node and the third test time node, and the maximum test compensation data comprises test luminance weights and test gray-scale weights corresponding to a plurality of time points after the third test time node; in the pre-test compensation data, the values of the plurality of test luminance weights and the plurality of test gray-scale weights gradually decrease according to the sequence of corresponding time points;

in the mid-test compensation data and the maximum test compensation data, the values of the plurality of test luminance weights and the plurality of test gray-scale weights remain unchanged; in the post-term test compensation data, the values of the plurality of test luminance weights and the plurality of test gray-scale weights gradually increase according to the sequence of corresponding time points; the values of the test luminance weights and the test gray-scale weights corresponding to the plurality of time points in the mid-term test compensation data are smaller than the values of the test luminance weights and the test gray-scale weights corresponding to the plurality of time points in the pre-term test compensation data and the post-term test compensation data; and the values of the test luminance weights and the test gray-scale weights corresponding to the plurality of time points in the maximum test compensation data are larger than the values of the test luminance weights and the test gray-scale weights corresponding to the plurality of time points in the pre-term test compensation data and the post-term test compensation data.

Figure 2:
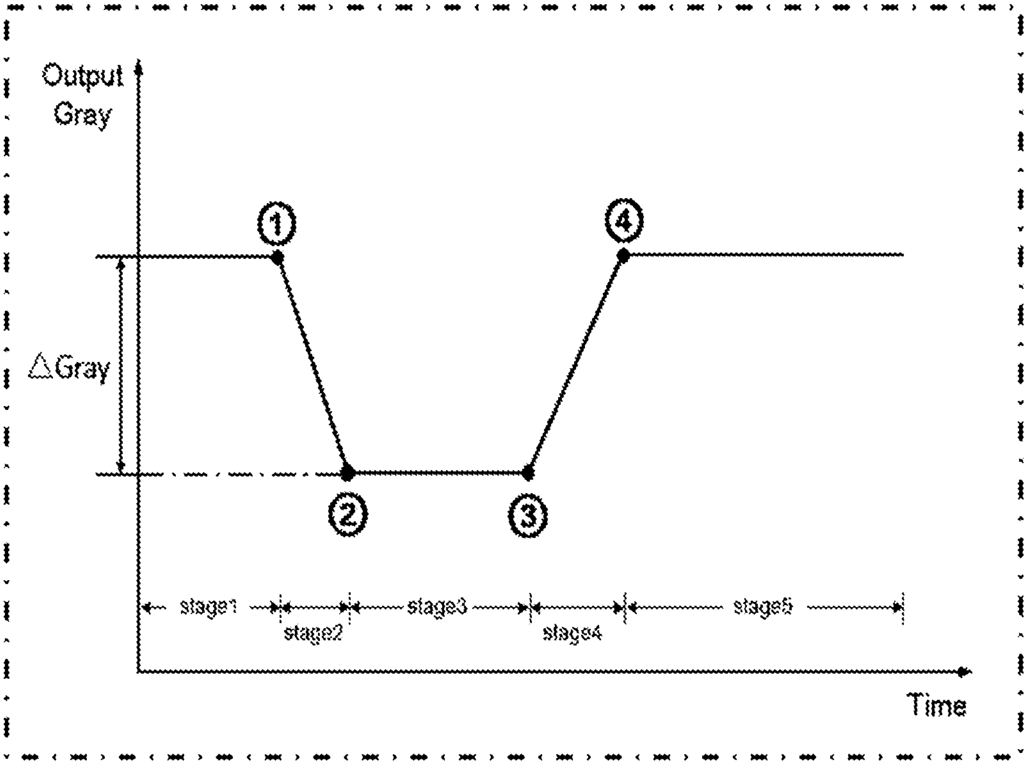
FIG. 2 is a schematic diagram of a gray-scale output at different stages after compensation provided by an exemplary embodiment of the present disclosure.

The compensation apparatus in the embodiment of the present disclosure comprises a second timer, a second memory, a temperature sensor, which may be applied to the aging test of the display panel, and as shown in FIG. 2, which may be an output of the gray-scale values of pixel data of the display panel during the test process or at different stages (stage1 to stage5) during the actual use of the display panel, wherein the abscissa is the time and the ordinate is the output of the gray-scale value. In FIG. 2, stage 1 to stage 5 are divided according to the positions of four points ① to ④, wherein the stage 2 to the stage 5 may respectively correspond to the time stages corresponding to the pre-term test compensation data, the mid-term test compensation data, the post-term test compensation data and the maximum test compensation data in the aging test process of the display panel; and during the use of the display panel, the stage of stage1 in FIG. 2 may be omitted, and the stage 2 to the stage 5 in FIG. 2 may respectively correspond to the time stages corresponding to the pre-term compensation parameter set, the mid-term compensation parameter set, the post-term compensation parameter set and the maximum compensation parameter set in the embodiment described above during the use of the display panel. In the embodiment of the present disclosure, the gray-scale data of the OLED display panel may be compensated by the compensation apparatus, and by taking advantage of the defect of OLED display panel itself (at the initial stage of lighting, the luminance attenuation of the screen is rapid, but after a period of continuous aging, the aging speed tends to be stable), on the premise of meeting the display requirements, the luminance is decreased by appropriately decreasing the gray scale in the preceding term, the gray scale is maintained in the middle term, and the gray scale is slowly increased in the post term, so as to slow down the aging of the OLED display panel and make the gray scale displayed by the OLED display panel relatively consistent in the whole life cycle.

Figure 4:
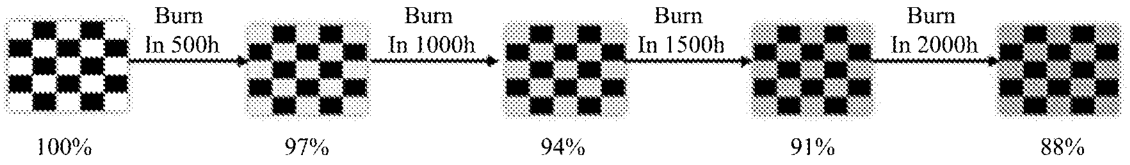
FIG. 4 is a schematic diagram of an aging process of a display panel.
Figure 5:
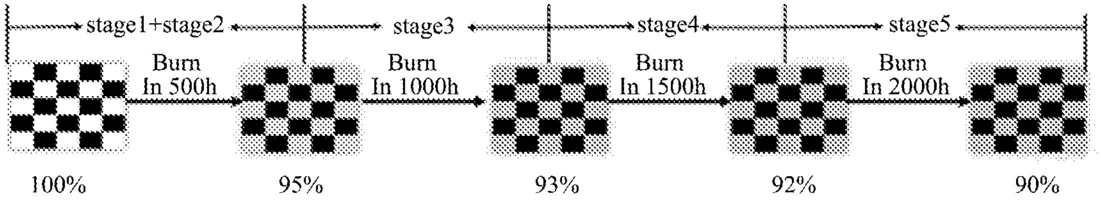
FIG. 5 is a schematic diagram of an aging process of a display panel provided by an exemplary embodiment of the present disclosure.

FIG. 4 is a schematic diagram of gray-scale display of display panel at different stages without using a compensation apparatus to compensate the gray scale, and FIG. 5 is a schematic diagram of the gray scale display of display panel at different stages in a case where the gray scale is compensated using the compensation apparatus of the embodiment of the present disclosure, wherein the percentages in FIG. 4 and FIG. 5 are the percentages of the gray-scale display for the current phase versus the gray-scale display with no attenuation, and from FIG. 4 and FIG. 5, it can be seen that with the extension of the use time of the display panel, the displayed gray scale gradually decreases, that is, the display panel gradually ages. After compensating the gray scale of the display panel by using the compensation apparatus provided by the embodiment of the present disclosure, the aging speed of the display panel will slow down, thus alleviating the aging of the display panel to a certain extent.

In an embodiment of the present disclosure, the processor 13 may acquire pixel data from a host. For example, the processor 13 may receive pixel data from the host picture during testing the aging of a display panel.

Figure 6:
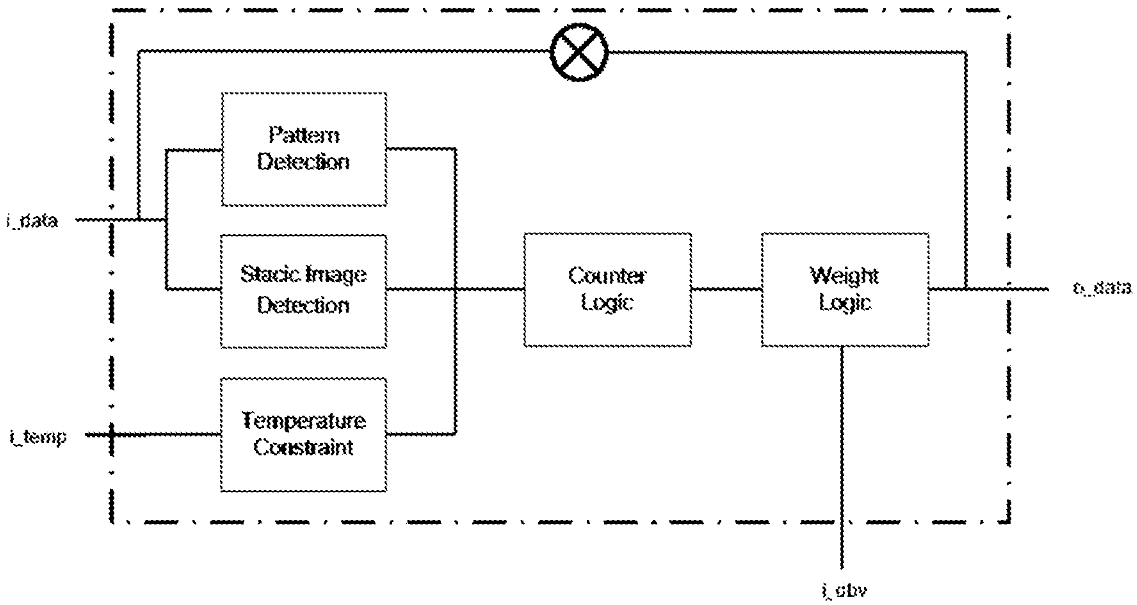
FIG. 6 is a logical structure diagram of a processor provided by an exemplary embodiment of the present disclosure.

In an exemplary implementation, the logical structure of the processor 13 may be divided into five functional modules (these five functional modules of which may be achieved by one or more algorithms) as shown in FIG. 6: a gray-scale distribution detection module (Pattern Detection), a static image detection module (Static Image Detection), a temperature constraint module (Temperature Constraint), a gray-scale logic module (Counter Logic) and a luminance Weight Logic module (Weight Logic), and the working process of the processor 13 will be illustrated with reference to FIG. 6 below, by taking testing the aging process of the display panel as an example. After the processor 13 receives the pixel data (i_data), each functional module in the processor performs the following operations.

In the gray-scale distribution detection function module (Pattem Detection), determining whether the gray-scale distribution reaches the high gray-scale threshold or the low gray-scale threshold according to the gray-scale distribution histogram of pixel data (that is, determining whether the high gray-scale and the low gray-scale are concentrated), and for example, determining by analyzing the gray-scale (gray-scale data in pixel data) distribution of the picture sent by TCON/DIC, wherein in the gray-scale distribution map shown in FIG. 3, the low gray-scale (the gray-scale value is less than Low Gray) and high gray-scale (the gray-scale value is greater than High Gray) distributions are relatively concentrated; and in the gray-scale distribution of the pixel data of a chessboard, the gray scale less than 10 accounts for 40%, and the gray scale greater than 250 Gray accounts for 40%, so it is easy to screen out the chessboard pictures. However, for general pictures, the gray-scale is widely distributed or the highest gray scale and the lowest gray scale account for a small proportion. In an embodiment of the present disclosure, the gray-scale distribution detection function module (Pattem Detection) may determine whether the gray-scale compensation condition is met according to the preset high gray-scale threshold and low gray-scale threshold.

After a static image detection module (Static Image Detection) receives the frame synchronization signal (v-sync) of each frame, whether the input picture data (pixel data) is the same as the previous picture (i.e., the pixel data of the previous frame) is determined through a Cyclic Redundancy Check (the full name is called Cyclic Redundancy Check in English, CRC for short), and if the CRC check values of the current frame and the previous frame are the same, the input picture is determined to be the same picture as the previous picture, i.e., a still picture, at this time, the still picture may be counted (for example, by a counter) or the detection of the still picture may be timed. When the count value or timing value is larger than a certain set threshold, it is determined to be a Static Image state (static state), and the condition of compensating gray scale is reached, wherein the high gray-scale threshold value and the low gray-scale threshold value may be set according to the actual situation.

Temperature constraint module (Temperature Constraint) acquires the temperature (i_temp) fed back by the temperature sensor, and determine whether the temperature threshold is reached. If the temperature threshold is reached, the condition of gray-scale compensation will be met. Among them, the temperature threshold may be set according to the actual situation.

Counter logic module (Counter Logic) searches for the corresponding gray-scale weight according to the count value. For example, the gray-scale weights corresponding to different count values may be shown in Table 1.

TABLE 1

Examples of count weighting

| counter | count_weighting |
|---|---|
| 20000 | 1 |
| 100000 | 0.95 |
| 200000 | 0.9 |
| 500000 | 0.85 |
| 1000000 | 0.8 |
| 2000000 | 0.8 |
| 3000000 | 0.85 |
| 4000000 | 0.9 |
| 5000000 | 0.95 |
| >(6000000) | 1 |

Luminance Weight Logic Module (Weight Logic) acquires luminance data (i_dbv) and searches for the luminance weight (DBV_weighting) corresponding to the luminance data. For example, the correspondence between a plurality of luminance values and corresponding luminance weights may be as shown in Table 2.

TABLE 2

Examples of DBV weighting

| DBV | DBV_weighting |
|---|---|
| 0 | 1 |
| 1024 | 0.95 |
| 2048 | 0.9 |
| 3072 | 0.85 |
| 4095 | 0.8 |

In the embodiment of the present disclosure, whether to enable a compensation (i.e. whether to perform gray-scale compensation) may be determined according to the results obtained by the distribution detection module (Pattem Detection), the static image detection module (Static Image Detection) and the temperature constraint module (Temperature Constraint), and linear interpolation is adopted between the binding point and the binding point according to the count value and configuration parameters of the still picture. Configuration parameters may be thresholds, high gray-scale thresholds, low gray-scale thresholds, temperature thresholds of the count values, and the positions of the four points ① to ④ in FIG. 2 may be adjusted and the gray-scale weights of different count values in table 1 in the gray-scale logic module (Counter Logic) and the luminance weights of different luminance values in table 2 in the luminance weight logic module (Weight Logic) may be set by adjusting the threshold, the high gray-scale threshold value, the low gray-scale threshold value and the temperature threshold value of the count value to achieve the stages of stage 1 to stage 5 in FIG. 2.

For example, the count value (counter) of the still picture is 500,000, which corresponds to the gray-scale weight in Table 1 being 0.85 and the acquired luminance data (DBV) value being 3072, and corresponds to the luminance weight (DBV_weighting) in Table 2 being 0.85, the input gray scale (InGray) being 255, and the output gray scale being $$OutGray=InGray*count\_weighting*dbv\_weighting=255*0.85*0.85=184.2.$$

In an embodiment of the present disclosure, the count values (counter) in Table 2 may be converted to time points according to the picture frame rate, in other words, the count values (counter) correspond to the converted time points, and the count values (counter) in Table 2 may be represented by using the values of the time point converted by the count values (counter).

Figure 7:
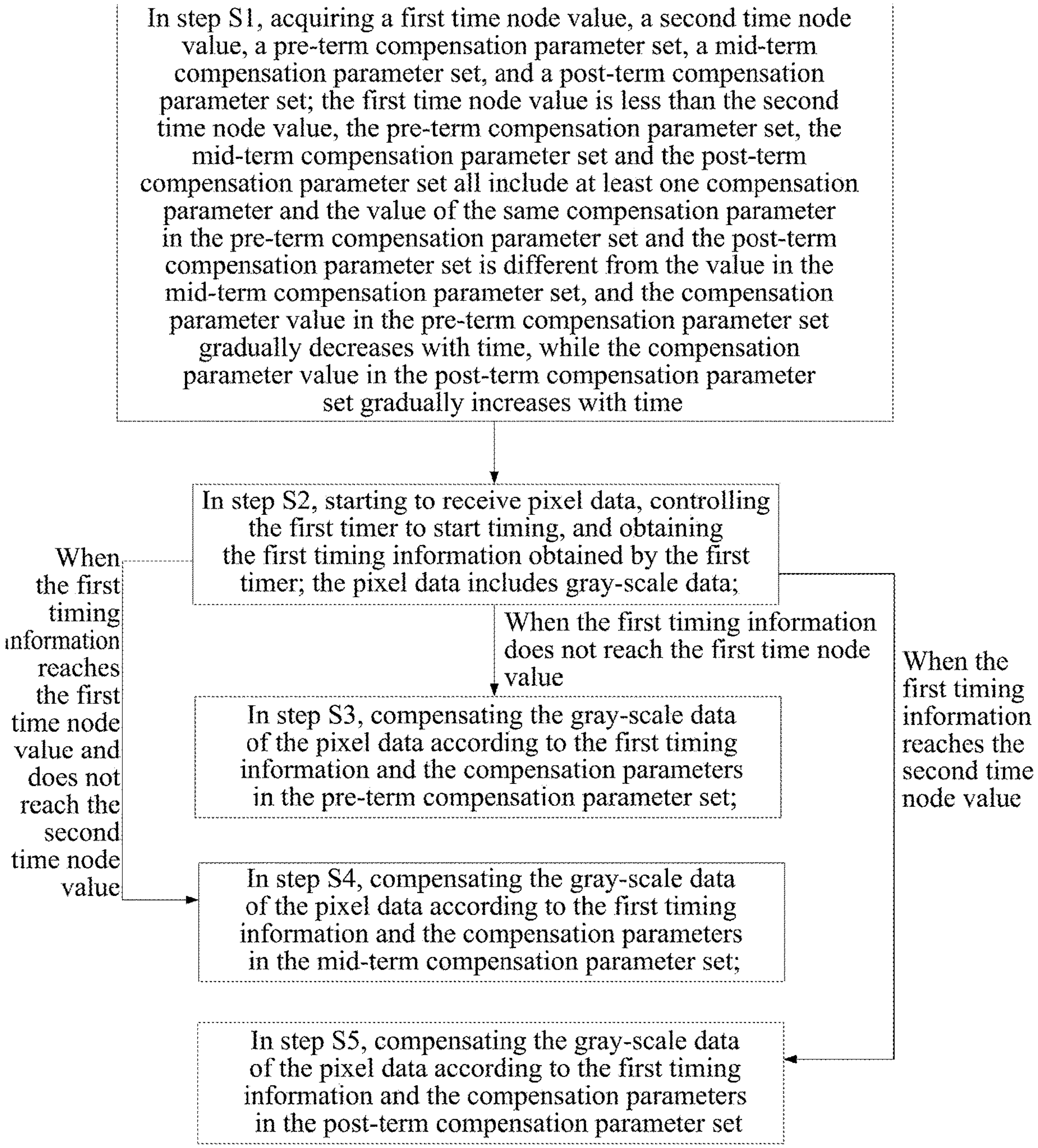
FIG. 7 is a flowchart of a compensation method provided by an embodiment of the present disclosure.

An embodiment of the present disclosure further provides a compensation method, as shown in FIG. 7, which may include:

in step S1, acquiring a first time node value, a second time node value, a pre-term compensation parameter set, a mid-term compensation parameter set, and a post-term compensation parameter set; the first time node value is less than the second time node value, the pre-term compensation parameter set, the mid-term compensation parameter set and the post-term compensation parameter set all include at least one compensation parameter and the value of the same compensation parameter in the pre-term compensation parameter set and the post-term compensation parameter set is different from the value in the mid-term compensation parameter set, and the compensation parameter value in the pre-term compensation parameter set gradually decreases with time, while the compensation parameter value in the post-term compensation parameter set gradually increases with time;

in step S2, starting to receive pixel data, controlling the first timer to start timing, and obtaining the first timing information obtained by the first timer; performing step S3 when the first timing information does not reach the first time node value, and performing step S4 when the first timing information reaches the first time node value and does not reach the second time node value; performing step S5 when the first timing information reaches the second time node value; the pixel data includes gray-scale data;

in step S3, compensating the gray-scale data of the pixel data according to the first timing information and the compensation parameters in the pre-term compensation parameter set;

in step S4, compensating the gray-scale data of the pixel data according to the first timing information and the compensation parameters in the mid-term compensation parameter set; and in step S5, compensating the gray-scale data of the pixel data according to the first timing information and the compensation parameters in the post-term compensation parameter set.

In an exemplary implementation, in the step S1, a value of the same compensation parameter in the pre-term compensation parameter set and the post-term compensation parameter set is different from a value of the same compensation parameter in the mid-term compensation parameter set, which may include a case that a value of the same compensation parameter in the pre-term compensation parameter set and the post-term compensation parameter set is greater than a value of the same compensation parameter in the mid-term compensation parameter set.

In an exemplary implementation, before starting to receive the pixel data in the step S2, the method may include:

acquiring a third time node value and a maximum compensation parameter set, wherein the third time node value is greater than the second time node value, and the maximum compensation parameter set at least includes one compensation parameter and a value of the same compensation parameter in the maximum compensation parameter set is greater than a value of the same compensation parameter in the post-term compensation parameter set; and after starting to receive the pixel data in step S2, the method may further include: compensating the gray-scale data of the pixel data according to the first timing information and the compensation parameter in the maximum compensation parameter set when the first timing information reaches the third time node value.

In an exemplary implementation, before starting to receive the pixel data in the step S2, the method may include: acquiring compensation parameters corresponding to a plurality of time points, wherein the pre-term compensation parameter set includes compensation parameters corresponding to a plurality of time points before the first time node; the mid-term compensation parameter set includes compensation parameters corresponding to a plurality of time points between the first time node and the second time node; the post-term compensation parameter set includes compensation parameters corresponding to a plurality of time points between the second time node and the third time node; the maximum compensation parameter set includes compensation parameters corresponding to a plurality of time points after the third time node; and searching a corresponding time point according to the first timing information, determining a compensation parameter set according to the searched time point, and compensating the gray-scale data of the received pixel data according to the compensation parameter corresponding to the searched time point in the determined compensation parameter set to obtain compensated gray-scale data.

In an exemplary implementation, in the pre-term compensation parameter set, a plurality of compensation parameter values of the same compensation parameter gradually decrease according to a sequence of the corresponding time points; in the mid-term compensation parameter set, the parameter values of the same compensation parameter are the same; in the post-term compensation parameter set, the plurality of parameter values of the same compensation parameter gradually increase according to a sequence of corresponding time points; in the maximum compensation parameter set, the parameter values of the same compensation parameter are the same.

In an exemplary implementation, the compensation parameters corresponding to the plurality of time points may include luminance weights and gray-scale weights corresponding to the plurality of time points; and steps S3 to S5 may include: determining a corresponding time point according to the first timing information, determining a corresponding luminance weight and a corresponding gray-scale weight according to the determined time point, multiplying the acquired luminance weight by the determined gray-scale weight to obtain a compensated gray-scale weight, and obtaining compensated gray-scale data according to the gray-scale data in the pixel data and the compensated gray-scale weight.

In an exemplary implementation, in steps S3 to S5, obtaining compensated gray-scale data according to the luminance information and the gray-scale information may include multiplying gray-scale data in the pixel data and the compensated gray-scale weight to obtain compensated gray-scale data.

In an exemplary implementation, after starting to receive the pixel data in the step S1, the method may further include: storing the first timing information of the first timer; and in the case of restarting after being powered off, reading the stored first timing information, and in the case of restarting and restarting to receive the pixel data, continuing timing on the basis of the stored first timing information.

In an exemplary implementation, before starting to receive the pixel data in the step S1, the method may include: in Step S01, obtaining a temperature threshold, a test compensation parameter corresponding to a plurality of time points, a high gray-scale threshold and a low gray-scale threshold; in Step S02, controlling the temperature sensor to acquire temperature information; in step S03, acquiring test pixel data, obtaining gray-scale distribution information of the test pixel data according to the gray-scale data in the test pixel data, controlling the second timer to start timing when the high gray scale ratio of the gray-scale distribution information exceeds the high gray-scale threshold, or the low gray-scale ratio of the gray-scale distribution information exceeds the low gray-scale threshold, or the acquired temperature information exceeds the temperature threshold, and compensating the gray-scale data in the test pixel data according to the second timing information and the test compensation parameters corresponding to the plurality of time points.

In an exemplary implementation, the test compensation parameters may include a test luminance weight and a test gray-scale weight, in step S03, the gray-scale data in the test pixel data is compensated according to the second timing information and the test compensation parameters corresponding to a plurality of time points, and it may further include: determining a corresponding time point according to the second timing information, determining a corresponding test luminance weight and a corresponding test gray-scale weight according to the determined time point, multiplying the test luminance weight by the test gray-scale weight to obtain a test compensation gray-scale weight, and multiplying the gray-scale data in the test pixel data by the test compensation gray-scale weight to obtain the compensated test gray-scale data.

In an exemplary implementation, before acquiring the test pixel data in step S03, the method may include: acquiring a first test time node value, a second test time node value, a third test time node value, a pre-term test compensation data, a mid-term test compensation data and a post-term test compensation data and the maximum test compensation data; a value of the first test time node is less than a value of the second test time node, and a value of ta second test time node is less than a value of the third test time node;

the pre-test compensation data comprises test luminance weights and test gray-scale weights corresponding to a plurality of time points before the first test time node, the mid-term test compensation data includes test luminance weights and test gray-scale weights corresponding to a plurality of time points between the first test time node and the second test time node, the post-test compensation data comprises test luminance weights and test gray-scale weights corresponding to a plurality of time points between the second test time node and the third test time node, and the maximum test compensation data comprises test luminance weights and test gray-scale weights corresponding to a plurality of time points after the third test time node; in the pre-test compensation data, the values of the plurality of test luminance weights and the plurality of test gray-scale weights gradually decrease according to the sequence of corresponding time points;

in the mid-test compensation data and the maximum test compensation data, the values of the plurality of test luminance weights and the plurality of test gray-scale weights remain unchanged; in the post-term test compensation data, the values of the plurality of test luminance weights and the plurality of test gray-scale weights gradually increase according to the sequence of corresponding time points; the values of the test luminance weights and the test gray-scale weights corresponding to the plurality of time points in the mid-term test compensation data are smaller than the values of the test luminance weights and the test gray-scale weights corresponding to the plurality of time points in the pre-term test compensation data and the post-term test compensation data; and the values of the test luminance weights and the test gray-scale weights corresponding to the plurality of time points in the maximum test compensation data are larger than the values of the test luminance weights and the test gray-scale weights corresponding to the plurality of time points in the pre-term test compensation data and the post-term test compensation data.

Figure 8:
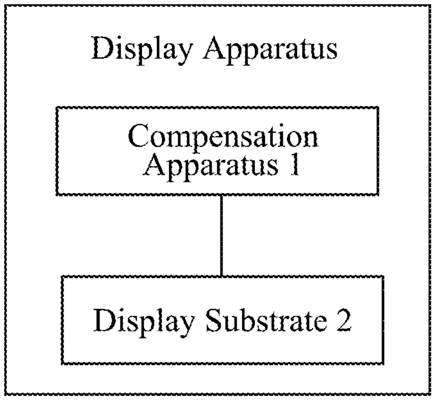
FIG. 8 is a schematic diagram of a structure of a display apparatus provided by an embodiment of the present disclosure.

An embodiment of the present disclosure further provides a display apparatus, as shown in FIG. 8, which may comprises a display substrate 2 and a compensation apparatus 1 described in any of the above embodiments, wherein the compensation apparatus 1 is electrically connected with the display substrate 2. In an embodiment of the present disclosure, the display apparatus may include a data signal line, the compensation apparatus 1 may be connected with the data signal line on the display substrate 2, the compensation apparatus 1 may supply the compensated gray-scale data to the data signal line on the display substrate 2, and the display substrate 2 displays according to the compensated gray-scale data received by the data signal line.

In an embodiment of the present disclosure, the display panel described above may include the display substrate 2.

In an implementation mode of the present disclosure, the display apparatus may be an electronic device having a display function, such as a mobile phone, a computer, a television (TV), a medical monitoring device, and a vehicle-mounted central control device.

An embodiment of the present disclosure further provides a working method of the display apparatus, including: compensating the gray-scale data in the pixels of the display panel according to the compensation method described in any of the above embodiments, obtaining the compensated gray-scale data and displaying according to the compensated gray-scale data.

An embodiment of the present disclosure further provides a non-transitory computer-readable storage medium configured to store computer program instructions, wherein when the computer program instructions are executed, the compensation method according to any one of the aforementioned embodiments may be implemented.

A compensation apparatus and a method, a display apparatus and a working method thereof, and a storage medium are provided in embodiments of the present disclosure, the display apparatus includes a memory, a first timer and a processor, wherein the first timer is configured to start timing from the processor receiving the pixel data to obtain the first timing information and send the first timing information to the processor, wherein the processor is configured to receive the pixel data and the first timing information, compensate the gray-scale data of the pixel data according to the first timing information and the compensation parameters in the pre-term compensation parameter set when the first timing information does not reach the first time node value, and compensate the gray-scale data of the pixel data according to the first timing information and the compensation parameters in the mid-term compensation parameter set when the first timing information reaches the first time node value and does not reach the second time node value; and the gray-scale data of the pixel data is compensated according to the first timing information and the compensation parameters in the post-term compensation parameter set when the first timing information reaches the second time node value. The compensation structure provided by the embodiment of the invention is applied to the display panel, so that the aging of the display panel is slowed down to a great extent, and the service life of the display panel is prolonged.

The drawings of the embodiments of the present disclosure only involve structures involved in the embodiments of the present disclosure, and other structures may refer to usual designs.

The embodiments of the present disclosure, that is, features in the embodiments, may be combined with each other to obtain new embodiments if there is no conflict.

Although the implementation modes disclosed in the embodiments of the present disclosure are described above, contents are only implementation modes for facilitating understanding of the embodiments of the present disclosure, which are not intended to limit the embodiments of the present disclosure. Those of skilled in the art to which the embodiments of the present disclosure pertain may make any modifications and variations in forms and details of implementation without departing from the spirit and scope of the embodiments of the present disclosure. Nevertheless, the scope of patent protection of the embodiments of the present disclosure shall still be subject to the scope defined by the appended claims.

The invention claimed is:

1. A compensation apparatus, comprising: a first memory, a first timer, and a processor, wherein the first memory is configured to store a first time node value, a second time node value, a pre-term compensation parameter set, a mid-term compensation parameter set and a post-term compensation parameter set; the first time node value is less than the second time node value, the pre-term compensation parameter set, the mid-term compensation parameter set and the post-term compensation parameter set each comprises at least one compensation parameter and a value of a same compensation parameter in the pre-term compensation parameter set and the post-term compensation parameter set is different from a value of the same compensation parameter in the mid-term compensation parameter set, values of the compensation parameter in the pre-term compensation parameter set are gradually decreased with time, values of the compensation parameter in the post-term compensation parameter set are gradually increased with time;

the first timer is connected with the processor and is configured to: start timing from that pixel data is received by the processor, obtain first timing information, and send the first timing information to the processor, wherein the pixel data comprises gray-scale data; and the processor is connected with the first timer and the first memory respectively, and is configured to: receive the pixel data and the first timing information, compensate the gray-scale data of the pixel data according to the first timing information and the compensation parameter in the pre-term compensation parameter set based on a determination that the first timing information does not reach the first time node value; compensate the gray-scale data of the pixel data according to the first timing information and the compensation parameter in the mid-term compensation parameter set based on a determination that the first timing information reaches the first time node value and does not reach the second time node value; and compensate the gray-scale data of the pixel data according to the first timing information and the compensation parameter in the post-term compensation parameter set based on a determination that the first timing information reaches the second time node value.

2. The compensation apparatus according to claim 1, wherein the value of the same compensation parameter in the pre-term compensation parameter set and the post-term compensation parameter set is different from the value of the same compensation parameter in the mid-term compensation parameter set, which comprises: the value of the same compensation parameter in the pre-term compensation parameter set and the post-term compensation parameter set is greater than the value of the same compensation parameter in the mid-term compensation parameter set.

3. The compensation apparatus according to claim 1, wherein the first memory is further configured to store a third time node value and a maximum compensation parameter set, the third time node value is greater than the second time node value, and the maximum compensation parameter set at least comprises one compensation parameter and a value of the same compensation parameter in the maximum compensation parameter set is greater than the value of the same compensation parameter in the post-term compensation parameter set; and the processor is further configured to compensate the gray-scale data of the pixel data according to the first timing information and the compensation parameter in the maximum compensation parameter set based on a determination that the first timing information reaches the third time node value.

4. The compensation apparatus according to claim 3, wherein the first memory is configured to store compensation parameters corresponding to a plurality of time points, and the pre-term compensation parameter set comprises compensation parameters corresponding to a plurality of time points before the first time node value; the mid-term compensation parameter set comprises compensation parameters corresponding to a plurality of time points between the first time node value and the second time node value; the post-term compensation parameter set comprises compensation parameters corresponding to a plurality of time points between the second time node value and the third time node value; the maximum compensation parameter set comprises compensation parameters corresponding to a plurality of time points after the third time node value; and the processor is configured to search a corresponding time point according to the first timing information, determine a compensation parameter set according to the searched time point, and compensate the gray-scale data of the received pixel data according to a compensation parameter in the determined compensation parameter set corresponding to the searched time point to obtain compensated gray-scale data.

5. The compensation apparatus according to claim 4, wherein in the pre-term compensation parameter set, a plurality of compensation parameter values of a compensation parameter are gradually decreased according to a sequence of the corresponding time points;

in the mid-term compensation parameter set, parameter values of a compensation parameter are the same;

in the post-term compensation parameter set, a plurality of parameter values of a compensation parameter are gradually increased according to the sequence of corresponding time points; and in the maximum compensation parameter set, parameter values of a compensation parameter are the same.

6. The compensation apparatus according to claim 4, wherein the compensation parameters corresponding to the plurality of time points comprise luminance weights and gray-scale weights corresponding to the plurality of time points; and the processor is configured to: determine a corresponding time point according to the first timing information, determine a corresponding luminance weight and a corresponding gray-scale weight according to the determined time point, multiply the determined luminance weight by the determined gray-scale weight to obtain a compensated gray-scale weight, and obtain compensated gray-scale data according to the gray-scale data in the pixel data and the compensated gray-scale weight.

7. The compensation apparatus according to claim 6, wherein the processor is configured to multiply the gray-scale data in the pixel data by the compensated gray-scale weight to obtain the compensated gray-scale data.

8. The compensation apparatus according to claim 1, further comprising a timing memory;

the timing memory is connected with the processor and the first timer, and is configured to store the first timing information of the first timer; and the first timer is further connected to the timing memory, and is configured to read the first timing information in the timing memory in a case that the processor is restarted after being powered off, and to continue timing based on the first timing information stored in the first memory in a case that the processor is restarted and restarts to receive the pixel data.

9. The compensation apparatus according to claim 1, further comprising a second timer, a second memory and a temperature sensor;

the second memory is connected with the processor, and is configured to store a temperature threshold, test compensation parameters corresponding to a plurality of time points, a high gray-scale threshold and a low gray-scale threshold;

the temperature sensor is connected with the processor, and is configured to acquire temperature information and transmit the temperature information to the processor;

the second timer is connected with the processor, and is configured to perform timing under control of the processor to obtain second timing information and send the second timing information to the processor; and the processor is respectively connected with the second timer, the second memory and the temperature sensor, and is further configured to acquire test pixel data and the temperature information, obtain gray-scale distribution information of the test pixel data according to gray-scale data of the test pixel data, control the second timer to start timing based on a determination that a high gray scale ratio of the gray-scale distribution information exceeds a high gray-scale threshold, or a low gray-scale ratio of the gray-scale distribution information exceeds a low gray-scale threshold, or the acquired temperature information exceeds a temperature threshold, and compensate the gray-scale data in the test pixel data according to the second timing information and the test compensation parameters corresponding to the plurality of time points.

10. The compensation apparatus of claim 9, wherein the test compensation parameters comprises a test luminance weight and a test gray-scale weight; and the processor is configured to: determine a corresponding time point according to the second timing information, determine a corresponding test luminance weight and a corresponding test gray-scale weight according to the determined time point, multiply the test luminance weight by the test gray-scale weight to obtain a test compensation gray-scale weight, and multiply the gray-scale data in the test pixel data by the test compensation gray-scale weight to obtain compensated test gray-scale data.

11. The compensation apparatus according to claim 10, wherein the second memory is configured to store a first test time node value, a second test time node value, a third test time node value, pre-term test compensation data, mid-term test compensation data, post-term test compensation data and maximum test compensation data; the first test time node value is less than the second test time node value, and the second test time node value is less than the third test time node value; the pre-term test compensation data comprises test luminance weights and test gray-scale weights corresponding to a plurality of time points before a first test time node, the mid-term test compensation data comprises test luminance weights and test gray-scale weights corresponding to a plurality of time points between the first test time node and a second test time node, the post-term test compensation data comprises test luminance weights and test gray-scale weights corresponding to a plurality of time points between the second test time node and a third test time node, and the maximum test compensation data comprises test luminance weights and test gray-scale weights corresponding to a plurality of time points after the third test time node;

in the pre-term test compensation data, values of a plurality of the test luminance weights and a plurality of the test gray-scale weights are gradually decreased according to a sequence of corresponding time points;

in the mid-test compensation data and the maximum test compensation data, values of a plurality of the test luminance weights and a plurality of the test gray-scale weights remain unchanged;

in the post-term test compensation data, values of a plurality of the test luminance weights and a plurality of the test gray-scale weights are gradually increased according to a sequence of corresponding time points; and the values of the test luminance weights and the test gray-scale weights corresponding to the plurality of time points in the mid-term test compensation data are smaller than the values of the test luminance weights and the test gray-scale weights corresponding to the plurality of time points in the pre-term test compensation data and the post-term test compensation data; and the values of the test luminance weights and the test gray-scale weights corresponding to the plurality of time points in the maximum test compensation data are larger than the values of the test luminance weights and the test gray-scale weights corresponding to the plurality of time points in the pre-term test compensation data and the post-term test compensation data.

12. A display apparatus, comprising a display substrate and the compensation apparatus according to claim 1, wherein the compensation apparatus is electrically connected to the display substrate.

13. A compensation method, comprising:

acquiring a first time node value, a second time node value, a pre-term compensation parameter set, a post-term compensation parameter set and a maximum compensation parameter set; the first time node value is less than the second time node value, the pre-term compensation parameter set, the mid-term compensation parameter set and the post-term compensation parameter set each comprises at least one compensation parameter and a value of a same compensation parameter in the pre-term compensation parameter set and the post-term compensation parameter set is different from a value of the same compensation parameter in the mid-term compensation parameter set, compensation parameter values in the pre-term compensation parameter set are gradually decreased with time, and compensation parameter values in the post-term compensation parameter set are gradually increased with time;

starting to receive pixel data, controlling a first timer to start timing, and obtaining first timing information obtained by the first timer, wherein the pixel data comprises gray-scale data; and compensating the gray-scale data of the pixel data according to the first timing information and the compensation parameter in the pre-term compensation parameter set based on a determination that the first timing information does not reach the first time node value; compensating the gray-scale data of the pixel data according to the first timing information and the compensation parameter in the mid-term compensation parameter set based on a determination that the first timing information reaches the first time node value and does not reach the second time node value; and compensating the gray-scale data of the pixel data according to the first timing information and the compensation parameter in the post-term compensation parameter set based on a determination that the first timing information reaches the second time node value.

14. The compensation method according to claim 13, wherein the value of the same compensation parameter in the pre-term compensation parameter set and the post-term compensation parameter set is different from the value of the same compensation parameter in the mid-term compensation parameter set, which comprises: the value of the same compensation parameter in the pre-term compensation parameter set and the post-term compensation parameter set is greater than the value of the same compensation parameter in the mid-term compensation parameter set.

15. The compensation method according to claim 13, wherein before starting to receive the pixel data, the method further comprises:

acquiring a third time node value and a maximum compensation parameter set, wherein the third time node value is greater than the second time node value, and the maximum compensation parameter set at least comprises one compensation parameter and a value of a same compensation parameter in the maximum compensation parameter set is greater than the value of the same compensation parameter in the post-term compensation parameter set; and wherein after starting to receive the pixel data, the compensation method further comprises:

compensating the gray-scale data of the pixel data according to the first timing information and the compensation parameter in the maximum compensation parameter set based on a determination that the first timing information reaches the third time node value.

16. The compensation method of claim 15, wherein before starting to receive the pixel data, the method further comprises:

acquiring compensation parameters corresponding to a plurality of time points, wherein the pre-term compensation parameter set comprises compensation parameters corresponding to a plurality of time points before the first time node value; the mid-term compensation parameter set comprises compensation parameters corresponding to a plurality of time points between the first time node value and the second time node value; the post-term compensation parameter set comprises compensation parameters corresponding to a plurality of time points between the second time node value and the third time node value; the maximum compensation parameter set comprises compensation parameters corresponding to a plurality of time points after the third time node value; and searching a corresponding time point according to the first timing information, determining a compensation parameter set according to the searched time point, and compensating the gray-scale data of the received pixel data according to a compensation parameter corresponding to the searched time point in the determined compensation parameter set to obtain compensated gray-scale data.

17. The compensation method according to claim 16, wherein in the pre-term compensation parameter set, a plurality of compensation parameter values of a compensation parameter are gradually decreased according to a sequence of the corresponding time points;

in the mid-term compensation parameter set, parameter values of a compensation parameter are the same;

in the post-term compensation parameter set, a plurality of parameter values of a compensation parameter are gradually increased according to a sequence of corresponding time points; and in the maximum compensation parameter set, parameter values of a compensation parameter are the same.

18. The compensation method according to claim 16, wherein the compensation parameters corresponding to the plurality of time points comprises luminance weights and gray-scale weights corresponding to the plurality of time points; and searching the corresponding time point according to the first timing information, determining the compensation parameter set according to the searched time point, and compensating the gray-scale data of the received pixel data according to the compensation parameter corresponding to the searched time point in the determined compensation parameter set to obtain compensated gray-scale data comprises:

determining a corresponding time point according to the first timing information, determining a corresponding luminance weight and a corresponding gray-scale weight according to the determined time point, multiplying the determined luminance weight by the determined gray-scale weight to obtain a compensated gray-scale weight, and obtaining compensated gray-scale data according to the gray-scale data in the pixel data and the compensated gray-scale.

19. The compensation method according to claim 18, wherein obtaining the compensated gray-scale data according to the gray-scale data in the pixel data and the compensated gray-scale weight comprises: multiplying the gray-scale data in the pixel data by the compensated gray-scale weight to obtain the compensated gray-scale data.

20. The compensation method according to claim 13, wherein after starting to receive the pixel data, the method further comprises:

storing the first timing information of the first timer; and in a case of restarting a compensation apparatus to which the compensation method is applied after the compensation apparatus being powered off, reading the stored first timing information, and in a case of restarting the compensation apparatus and the compensation apparatus restarting to receive the pixel data, continuing timing on a basis of the stored first timing information.

* * * * *